United States Patent [19]

Lewis

[11] 3,964,707
[45] June 22, 1976

[54] UNDERGROUND CONDUIT HOLDER

[76] Inventor: Gerald F. Lewis, 1850 Columbia, Berkley, Mich. 48072

[22] Filed: Dec. 23, 1974

[21] Appl. No.: 535,664

[52] U.S. Cl............................ 248/49; 248/68 CB
[51] Int. Cl.².................................. A47G 29/02
[58] Field of Search............... 248/49, 68 R, 68 CB, 248/67.5, 67.7, 74 PB; 24/81 CC, 201 C; 46/29, 31, 26

[56] References Cited
UNITED STATES PATENTS

| | | | |
|---|---|---|---|
| 3,154,870 | 11/1964 | Hopp et al. | 24/201 C |
| 3,191,727 | 6/1965 | Schmeltz et al. | 24/201 C |
| 3,521,332 | 7/1970 | Kramer | 24/81 CC |
| 3,523,667 | 8/1970 | Guerrero | 248/49 |
| 3,582,029 | 6/1971 | Moesta | 248/68 |
| 3,696,855 | 10/1972 | Kira | 160/135 |
| 3,765,629 | 10/1973 | Voelker et al. | 248/68 CB |
| 3,856,246 | 12/1974 | Sinko | 248/49 |

FOREIGN PATENTS OR APPLICATIONS

| | | | |
|---|---|---|---|
| 377,258 | 6/1964 | Switzerland | 46/31 |

*Primary Examiner*—Roy D. Frazier
*Assistant Examiner*—Robert A. Hafer
*Attorney, Agent, or Firm*—Hugh L. Fisher; Irvin L. Groh

[57] ABSTRACT

An underground conduit holder including a pair of identical conduit holding frames held together in spaced relationship by a pair of identical clamping structures. The clamping structures include latch portions which flex to facilitate easy attachment and detachment to holding frames without the requirement of special tools.

2 Claims, 4 Drawing Figures

U.S. Patent   June 22, 1976   3,964,707
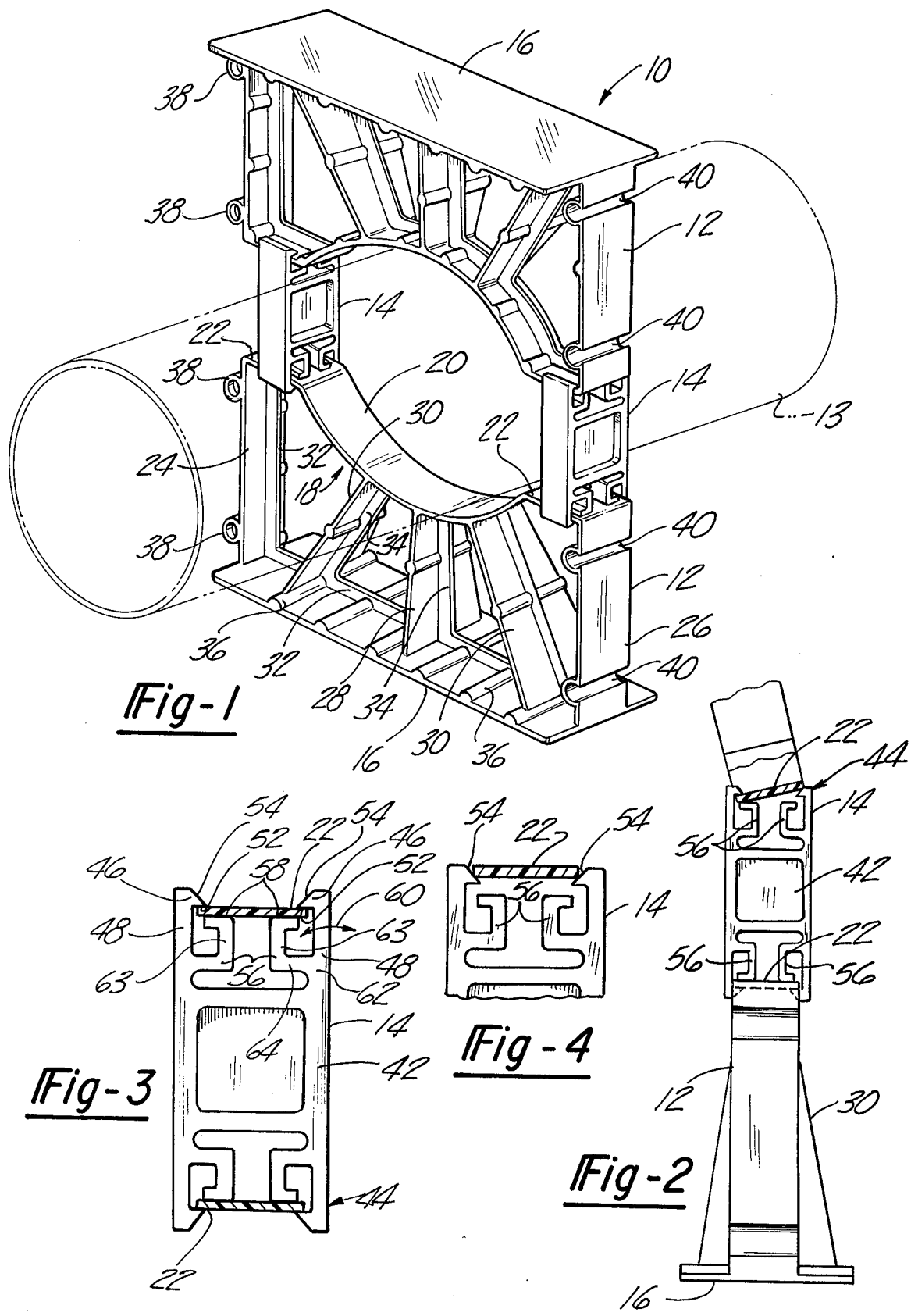

UNDERGROUND CONDUIT HOLDER

BACKGROUND OF THE INVENTION

This invention relates to conduit holders and spacers adapted to support conduits in parallel spaced relation to each other.

Underground conduit holders are used for supporting conduits or pipes which may be used to envelop electrical wires or to convey fluids. Such conduits and pipes must be spaced, particularly in a case of electrical wires, to insure that the electrical fields do not interfere with each other. Also since the conduits are frequently installed underground, a uniform minimum spacing is required to insure that the entire cavity within which the conduits are to be located can be filled with material such as sand, gravel or concrete. During the filling or covering operation, it is necessary that the conduit supports remain in position to prevent displacement of the conduits or pipes and to prevent their possible fracture during the covering operation.

Heretofore, conduit supports and spacers made of an inert plastic material have been employed for such purpose, but such supports have had deficiencies in that they were difficult to assemble, had a high material content which made them expensive to manufacture and sell or required a multiplicity of parts requiring a large inventory to accomodate field installation of conduits.

SUMMARY OF THE INVENTION

An underground conduit holder has been provided which requires only two different parts to form an assembly to hold any single conduit such that a pair of holding frames are held in spaced apart relationship when in engagement with the conduit by a pair of clamping structures which are easily assembled and disassembled in the field without the use of tools and which require a relatively low material content making it feasible to economically manufacture the parts of plastic materials. The holding frame structures are maintained in engagement with selected portions of a conduit by clamping arrangement which includes flexible latch portions permitting easy assembly and disassembly of the conduit holder.

DESCRIPTION OF THE DRAWINGS

FIG. 1 is a perspective view of an underground conduit holder assembly embodying the invention;

FIG. 2 is an end view with portions broken away and in section showing relative position of parts during assembly;

FIG. 3 is a view, at an enlarged scale showing a clamping structure forming part of the conduit holder assembly; and FIG. 4 is a broken away sectional view showing the relative position of parts prior to attachment to each other.

DETAILED DESCRIPTION

Referring to the drawings and particularly to FIG. 1 the conduit holder assembly 10 embodying the invention is made up of a pair of identical conduit holding frames 12 which are adapted to be disposed at diametrically opposite sides of a conduit indicated in phantom lines at 13 and to be held together by a pair of identical clamp structures 14 disposed at diametrically opposed sides of the conduit.

Each of the holder frames 12 has a generally rectangular configuration which is adapted to be disposed transversally to the axis of the conduit 13. One side of each of the frame 12 forms a base structure 16 and the opposite side forms a support structure 18, an intermediate portion of which is concave as indicated at 20 to form a bearing surface for a circumferential surface portion of a conduit. The opposite ends of the support structure 18 at the extremities of the concave portion 20 form flange portions 22 for detachably receiving the clamp members 14. The concave portion 20 encompasses an arc of substantially less than 180° and when the holding frame is positioned on a conduit 13 the concave surfaces 20 engage diametrically opposed portions of the conduit.

The base 16 and the side forming the support structure 18 are held in spaced apart relation by a plurality of struts which include end struts 24 and 26 extending between flange portions 22 and the base structure 16, and also a central strut 28 and intermediate struts 30 which extend between the concave portion of the support structure 18 and the base structure.

The perimeter of the holding frame is made up by the base structure 16, support structure 18 and end struts 24 and 26 all of which have a continuous central web 32, which merges and is formed integrally with webs 34 formed on opposite surfaces of each of the struts 28 and 30. The side struts 24 and 26 and the support structure 18 are of substantially the same width and form a continuous flange which merges with the relatively wider base 16. The struts 28 and 30 are of the same width at one end where they merge with the arcuate flange forming the concave position 20 and diverge toward their opposite end where they merge with the relatively wide base 16. Integral reinforcing bosses 36 on the base structure 16 merge with web 32 and serve to stiffen the base structure 16 in a direction longitudinally of the axis of the conduit held by the holder frames 12. The holder frames 12 are molded of plastic material and the webs 32, 34 and bosses 36 serve to make the frame relatively rigid with a minimum of material.

The side struts 24 have a pair of spaced generally cylindrical tongue portions 38 which extend in the direction of the axis of the conduit which is to be held and the side struts 26 are provided with a pair of similarly spaced cylindrical grooves 40 which are adapted to receive the tongues 38 on adjoining holder frames 12.

The clamp members 14 by which the frame structures 12 are held in position relative to a conduit and in spaced relationship to each other are identical and as seen in FIGS. 2 and 3 each has a generally rectangular configuration. Each clamp member has a central body portion 42 with a pair of oppositely facing latch portions 44 at each end of the body portion.

The latch portions 44 at one end of the body member are intended to receive the flange 22 of one of the frame structures 12 and the latch portions 44 at the opposite end of the body member are intended to receive the flange 22 at a corresponding side of the other structure 12.

Each latch portion 44 includes a hook-like latch element 46 having a leg 48 which merges with and is formed integrally with the body member. The free end of the leg 48 has the latch element 46 protruding to one side of the leg 48 and has a surface 52 for engaging an inner surface of the flange portion 22 and a diverging, oppositely facing cam surface 54.

A support structure 56 having a generally C-shaped configuration has one end merging with the leg 48 and the free end of the C-shaped support 56 has a flange engaging surface 58 which faces toward the adjoining surface 52 of the latch element 46. When in the position shown in FIG. 3, the surfaces 52 and 58 forming part of one of the latch portions 44 engages opposite sides of one of the flange portions 22.

The clamp structures 14 are of unitary construction and are made of a strong but deflectable plastic material so that upon assembly and disassembly of the conduit holder each of the legs 48 may be flexed in the direction of the arrow indicated at 60 about a juncture indicated generally at 62. Similarly the support structure 56 can flex as a unit about the juncture 62 or the intermediate leg 63 of the C-shaped member may be flexed relative to the leg 64 of the C-shaped member connected to the leg 48. This flexibility permits the spacing between the surfaces 52 and 58 to change sufficiently to accommodate flange portions 22 having variations in thickness.

To assemble the conduit holding structure a pair of clamps 14 are attached to the pair of flange portions 22 of a frame structure 12 formed at opposite sides of the concave portion 20. This is accomplished with the clamps 14 disposed in a plane transverse to the plane of the frame structure and latch portions 44 as shown at the upper portion of the clamp member 14 in FIG. 2. The clamp structure 14 will be in a slightly angular relationship to the holding frame 12 as seen in FIG. 3 with the cam surface 54 of the oppositely facing latch portion 44 in engagement with the outer surface of the flange 22. Upon movement of the clamp structure 14 into alignment with the plane of the frame structure 12, the cam surface 54 acts on the outer surface of the flange 22 and flexes both of the legs 48 apart so that the opposed latch elements 46 separate sufficiently to permit the surface adjacent the opposite edge of the flange structure 22 to come into engagement with the flange engaging surface 58 after which the legs 48 return to their normal position so that the surfaces 52 on the hook-like elements 46 engage an inner surface of the flange portions 22.

After clamp structures 14 are attached to a frame structure 12 and after a plurality of such arrangements are arranged longitudinally on a conduit a second frame member 12 is placed in position relative to the conduit and to the first frame member at a slight angle to the plane of the latter so that the flange portions 22 at opposite sides of the frame have corresponding edge portions disposed between the oppositely facing surfaces 52 and 58 of corresponding latch portions 44 on the pair of clamp structures already attached to the first frame structure 12. When the second frame structure is tilted to an upright position, the flange portions 22 engage cam surfaces 54 on the pair of clamps 14 and force the latch elements 50 away from each other so that the unsecured side edge of the flange 22 comes into position between the associated surfaces 52 and 56. Alternatively, the second frame member 12 can be connected to the clamp structure already attached to a first frame member 12 by disposing the frame members in the same plane as shown in FIG. 4 with the flange portion 22 in engagement with the pair of cam surfaces 54. Subsequent relative movement of the frame 12 and clamp member 14 flexes both hook elements 46 away from each other until the flange portion 22 engages the stop surfaces 58 and the hook elements return to their holding position shown in FIG. 3.

If it should become necessary for any reason to disassemble the conduit holding structure for movement to another position on the conduit, one frame structure 12 may be tilted relative to the other frame structure which will cause deflection of the support structures 56 at one edge of the flange portion 22 so that the latch element 46 at the opposite edge of the flange 22 can be deflected outwardly to release the holding frame 12 from the clamp structure 14.

When the conduit holder assembly is assembled in position on a conduit with a pair of the clamps 14 in engagement with a pair of holding frames 12, it will be noted that the clamp structures 14 are prevented from movement in a direction transverse to the plane of the holder frames due to the interference of the legs 48 with opposite side edges of the flange portions 22. Also the clamps 14 can move relative to the frames 12 a limited amount transversely of a conduit within the limits offered by the concave portions 20 which prevents movement of the clamp structures inwardly and the end struts 24 and 26 which prevent movement of the clamp structures 14 outwardly. In this manner the clamp structures are confined in both the longitudinal and transverse direction to the axis of the conduit.

In the assembled condition of a pair of clamping frames 12 and a pair of clamping structures 14, the associated, facing flange portions 22 of the pair of frames are held in spaced apart relationship and the concave flange portions 20 engaging the conduit 13 can encompass an arc of substantially less than 180°. The resultant frames 12 are therefore smaller and require less material than frames which would embrace the entire circumferential surface of a conduit.

The operation described has referred to a single conduit hold assembly. However, conduits may be disposed in uniformly parallel spaced relation to each other by forming another conduit holder assembly on an adjacent conduit and by interlocking adjacent tongues 38 on the frame members 12 associated with one conduit into the grooves 40 on the frames 12 associated with the other conduit. Any number of conduits may be so disposed in one level and if it is desired to have a second tier of conduits, the assemblies 10 are positioned so that the base members 16 on the upper conduits abut the base member on the lower tier of conduits.

An underground holder assembly has been provided in which only two differently shaped parts; namely, a holding frame and a clamp are required to make a full conduit holder assembly which includes one pair of each of the two parts. The clamp structures provide for ready attachment and detachment of the frames to each other in a manner preventing relative movement of a pair of frames axially of a conduit by maintaining a pair of frames in the same plane and spaced apart relationship to each other. The frames and clamps are so constructed and arranged that the amount of materials required for their construction is minimized and yet the assembly results in an efficient rigid supporting and holding structure.

The embodiments of the invention in which an exclusive property or privilege is claimed are defined as follows:

1. An underground conduit holder comprising a pair of holding frames, each of said holding frames having a conduit engaging portion to engage an outer surface of a conduit in diametrically opposed relation to each other and being disposed in a common plane transverse to the axis of said conduit, each of said frames including a flange portion adjacent opposite ends of said conduit engaging portion, a pair of clamp structures each of which includes a body member, a pair of latch elements extending from one end of said body member for engagement with one of said flange portions of one of said frames, and a pair of latch elements extending from the other end of said body member for engagement with the corresponding one of the flange portions of the other of said frames to prevent separation of the said frame members relative to each other axially and radially of said conduit, each of said latch elements including a hook element and a stop element connected to said hook element, said stop and hook elements presenting facing surfaces deflectable relative to each other to engage opposite surfaces of said flange portions for accommodating varying thicknesses of said flange portions.

2. The combination of claim 1 in which said hook elements present a cam surface engageable with said flange portion to deflect said hook element for receiving said flange portion of one of said frames upon movement of said frames toward each other.

* * * * *